United States Patent [19]
Okada et al.

[11] Patent Number: 4,699,853
[45] Date of Patent: Oct. 13, 1987

[54] FUEL CELL

[75] Inventors: Hideo Okada; Sigeru Okabe; Yoshio Iwase, all of Hitachi; Masato Takeuchi, Katsuta; Kohki Tamura, Hitachi, all of Japan

[73] Assignee: Hitachi, Ltd., Tokyo, Japan

[21] Appl. No.: 838,716

[22] Filed: Mar. 12, 1986

[30] Foreign Application Priority Data

Mar. 22, 1985 [JP] Japan ................................ 60-55913

[51] Int. Cl.[4] ............................................. H01M 8/24
[52] U.S. Cl. ...................................... 429/37; 429/38; 429/39
[58] Field of Search ............................. 429/37, 38, 39

[56] References Cited

U.S. PATENT DOCUMENTS 3,188,242  6/1965  Kordesch et al. .................. 429/38
3,554,803  1/1971  Poirier ................................ 136/86

FOREIGN PATENT DOCUMENTS 0075380  3/1983  European Pat. Off. .
818640  10/1951  Fed. Rep. of Germany .
858841  12/1952  Fed. Rep. of Germany .
1530364  6/1968  France .
2309991  11/1976  France .
163181  9/1983  Japan .
161270  9/1983  Japan .
161269  9/1983  Japan .
163180  9/1983  Japan .
161266  9/1983  Japan .

*Primary Examiner*—Donald L. Walton
*Attorney, Agent, or Firm*—Antonelli, Terry & Wands

[57] ABSTRACT

A unit cell is formed by a plurality of sub-unit cells as a result of dividing each of the electrodes and electrolytic plate into a plurality of parts. That is, the electrodes and the electrolytic plate are each divided into two parts by electrolytic plate support portions projected from the surfaces of separators. The support portions are pressed in contact with the end portions of the electrolytic plate so as to support the electrolytic plate and seal the reaction gas, preventing it from leaking. The electrolyte support portions of the separators can be provided with electrolyte supply paths, through which the electrolyte is supplied and impregnated into the electrolytic plate. The electrolyte can be supplied via the apertures provided in the separators, to the electrolyte supply paths.

19 Claims, 5 Drawing Figures

FUEL CELL

BACKGROUND OF THE INVENTION

This invention relates to a fuel cell and particularly to an improved fuel cell suitable for the application to a Molten Carbonate Fuel Cell or Phosphoric Acid Fuel Cell.

Generally, a plurality of unit cells are laid upon one another to form a fuel cell. A single unit cell is produced by holding an electrolytic plate (matrix) in which an electrolyte is impregnated, between a pair of electrodes (anode and cathode) and further holding them between a pair of separators. In order to produce a greater electric power by the fuel cell, it is necessary to increase the effective areas of the electrodes of the unit cell and stack a great number of unit cells. A fuel cell integrally formed by such electrodes, electrolytic plate and separators is proposed as disclosed, for example, in Japanese Patent Un-Examined Publication Nos. 58-216365, 58-220368, 59-27467 and 59-27468.

If the electrodes, electrolytic plate and separators are simply increased in size for increasing the capacity of the unit cell, the following problems occur.

One of the problems is that it is technically difficult to produce thin electrodes and electrolytic plate with large area, and smooth surfaces. Thus their sizes are limited. Particularly when the unit cells are stacked in terms of space effect, it is desired to use thinner electrodes and electrolytic plate. Secondly, larger area electrodes and electrolytic plate have less mechanical strength. That is, since the fuel cell is operated in a relatively high-temperature atmosphere, it is stressed by the temperature-change cycle with the result that cracks or crevices occur in the electrodes and electrolytic plate. Therefore, the reaction gas and electrolyte leak via the cracks or crevices, shortening the life of the cell. Particularly in the case of a Molten Carbonate Fuel Cell, the operating temperature reaches 650° C. at which a thin electrolytic plate made of ceramics suffers a great stress detrimental to its strength. Thirdly, it becomes difficult for the electrolyte to be supplied to the large-sized fuel cell. When the fuel cell is operated for a long period of time, the electrolyte is gradually consumed so that the cell performance is reduced. Thus, in order to restore the cell performance to the initial state, it is necessary to supply the electrolyte properly. Also, it is difficult to uniformly impregnate the electrolyte into all parts of the electrolytic plate of large size and it takes a long time to do so.

These problems limited to make the unit cell in smaller size.

SUMMARY OF THE INVENTION

It is an object of this invention to provide a fuel cell including a unit cell capable of being large-sized for high power by solving the above problems.

In order to achieve this object, this invention proposes a unit cell having a plurality of support portions provided on the surfaces of the separators opposite to both sides of the electrolyte plate, thereby supporting the electrolyte plate and partitioning each of the electrodes and the electrolytic plate into parts. Therefore, the unit cell is formed by a plurality of smaller sub-unit cells into which it is partitioned by the support portions, that is, the electrodes and the electrolytic plate can be small-sized, and thus they are little changed in their shapes due to temperature change and are advantageous in mechanical strength. If a more number of support portions are provided on the separators, even a large-area electrolytic plate can withstand stress. In addition, since the electrolytic plate is partitioned into a plurality of small-area parts, the electrolyte can be smoothly supplied to the electrolytic plate as far as supply paths for electrolyte are properly provided.

The novel structure of the unit cell according to this invention is limited not only to the molten carbonate fuel cell and the phosphoric acid fuel cell, but also to various other types of fuel cells, and it can contribute to the production of large-capacity fuel cells.

DESCRIPTION OF THE PREFERRED EMBODIMENTS

Figure 1:
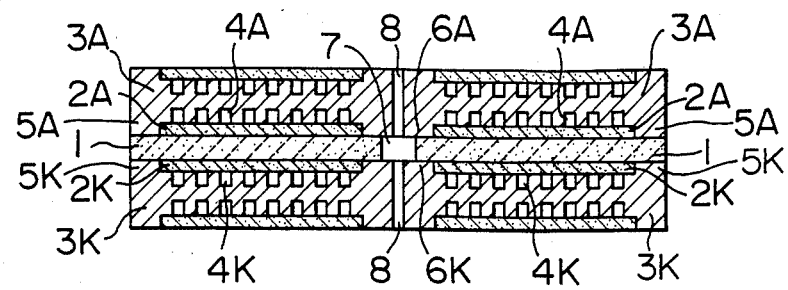
FIG. 1 is a cross-sectional view of one embodiment of a unit cell of a fuel cell according to this invention.

FIG. 1 is a cross-sectional diagram of one embodiment of a unit cell of this invention. The unit cell includes an electrolytic plate 1 at the center, a pair of electrodes (anode and cathode) 2A and 2K on the opposite sides of the plate, a pair of separators 3A and 3K on the outsides of the electrodes and gas flow paths 4A and 4K provided between the electrodes 2A, 2K and the separators 3A, 3K so that reaction gases (fuel and oxidizer) are flowed in the paths. Although the gas flow paths can have various different cross-sectional shapes, this embodiment employs grooves formed by a plurality of ribs, as the gas flow paths. In this embodiment, the reaction gases on the anode and cathode sides are flowed in the paths in the direction perpendicular to the sheet of the drawing. This type of the unit cell is the so-called parallel flow (or opposite flow) type. This invention is not limited to this type, but can be applied to the cross flow type as described later. At the opposite ends of the separators 3A, 3K are provided support end portions 5A, 5K which are projected to support the electrolytic plates by pressing. These support end portions 5A, 5K thus seal the electrolytic plates so that the electrolyte and reaction gases do not leak to the other electrodes or externally. This structure of the unit cell can generate a potential difference between the separators 3A and 3K and thus supply electric energy to the external. In order to produce a desired electric power, a number of the unit cells shown in FIG. 1 are stacked. Thus, for saving spaces, electrodes are desirably provided on both sides of each separator and used as anode and cathode electrodes of upper and lower unit cells as shown in FIG. 1.

Also, at the center of each separator 3A, 3K there is provided another projected electrolytic plate support portion 6A, 6K. The support portions 6A and 6K are attached to the opposite surfaces of the electrolytic plate 1. The electrolytic plate 1 is formed of two separate halves on the left and right sides of this support portion 6A, 6K, and similarly the electrode 2A, 2K is formed of two halves. Therefore, this unit cell is formed of two smaller parallel sub-unit cells. The performance of the unit cell is the same as long as it has equal electrode area even though the electrode is divided. If the unit cell is desired to be large-sized, the area of the separator 3A, 3K is increased, the support portion 6A, 6K is further added and each of the electrode and electrolytic plate is divided into two or more parts. Under these conditions, the strength of the electrode and electrolyte is not reduced. Even when the electrode is divided, and the electrolytic plate is not divided, the unit cell can withstand a mechanical stress because the central portion of the electrolytic plate is supported by the support portion 6A, 6K. In the embodiment of FIG. 1, a gap 7 is further provided between the two halves of the electrolytic plate 1 and used as an electrolyte dispersing path through which electrolyte is supplied to the electrolytic plate 1. The electrolyte is flowed through this dispersing path 7 in the direction perpendicular to the sheet of the drawing and diffusively permeates the electrolytic plate 1 from the sides of its left and right portions. This dispersing path 7 is communicated with the upper and lower adjacent ones through apertures 8 which are provided in the support portions 6A and 6K of the separators 3A and 3K. Therefore, the electrolyte can be smoothly supplied through the apertures and dispersing paths to the respective electrolytic plate. It is desirable to use an electrically insulating material on the surfaces of the apertures of the separators and of the electrolyte dispersing paths which the electrolyte is made in contact with, and to supply the electrolyte by capillary force. The electrically insulating material may be powder or fiber or an oxide, carbide or nitride such as alumina, zirconia, titania, silicon carbide, lithium aluminate or silicon nitride.

Figure 2:
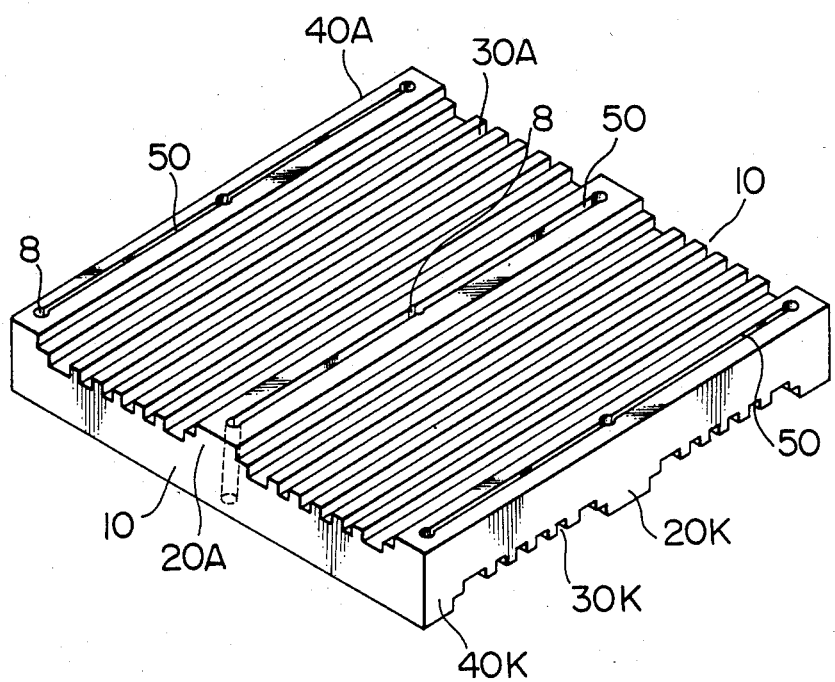
FIG. 2 is a perspective view of the separator of the unit cell in another embodiment according to this invention.

FIG. 2 shows a construction of a separator in another embodiment of a unit cell of this invention. Electrolytic plate support portions 20A and 20K are provided on the opposite sides of a separator 10 in the directions perpendicular to each other. In addition, a plurality of gas flow paths 30A, 30K are provided on both sides of each of the support portions 20A, 20K. The gas flow paths 30A and 30K provided on the opposite sides of the separator are perpendicular to each other. Therefore, this separator is called the cross flow type separator. Moreover, projected support end portions 40A and 40K are respectively provided on both edges of each of the opposite sides of the separator 10 in parallel with the gas flow paths on each side. These support end portions are pressed in contact with the end portions of the electrolytic plate, thus sealing it. The central support portions 20A and 20K divide the unit cell into two sub-unit cells. A groove is also provided in the surface of each of the central support portions 20A, 20K and support end portions 40A, 40K. These grooves are called electrolyte distribution grooves. The electrolyte distribution grooves 50 in the opposite surfaces of the separator 10 are communicated with each other through apertures 8 which are bored through the separator 10.

Figure 3:
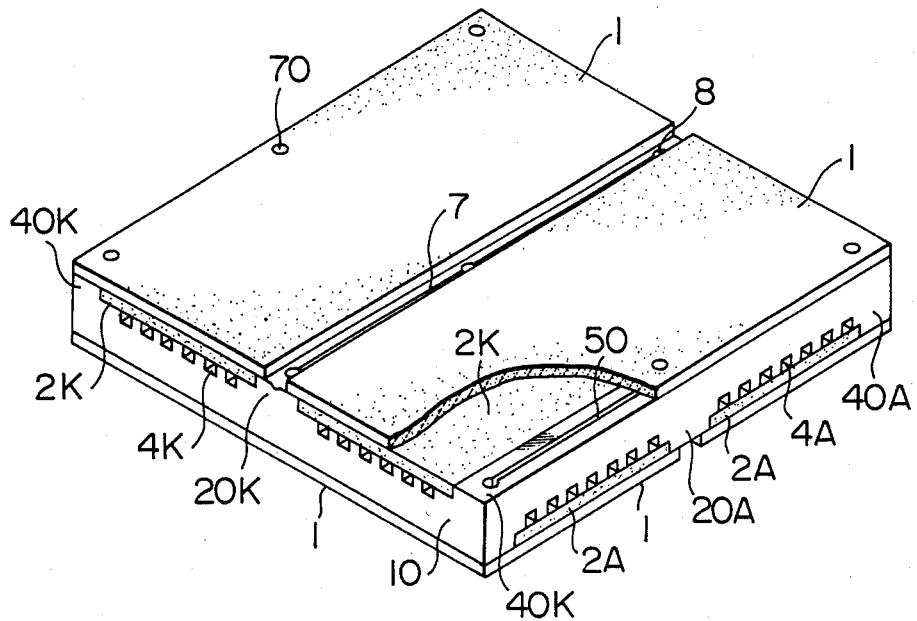
FIG. 3 is a perspective view of the structure of the unit cell using the separator of FIG. 2.

FIG. 3 shows the condition in which the separator 10 shown in FIG. 2 is mounted with electrodes and an electrolyte plate. The electrode 2A, 2K is also divided into two parts on both sides of the support portion 20A, 20K in the same way as in FIG. 1, and the electrolyte plate 1 is divided into two parts by the support portion 20A, 20K. The support portions 20A, 20K, support end portions 40a, 40K and electrolytic plate 1 are made in intimate contact with one another so that the reaction gases are not leaked to the outside. Holes 70 are provided in the portions where the electrolytic plate 1 is made in contact with the support end portions 40A, 40K. These holes 70 are connected to the apertures 8 of the separator 10. The electrolyte is supplied through the apertures 8 to the electrolyte dispersion grooves 50 and to the electrolyte dispersion path 7, from which it is diffusely permeated into the electrolytic plate 1. When one of the pile of FIG. 3 is laid on another, one unit cell is formed between the upper and lower separators.

Figure 4:
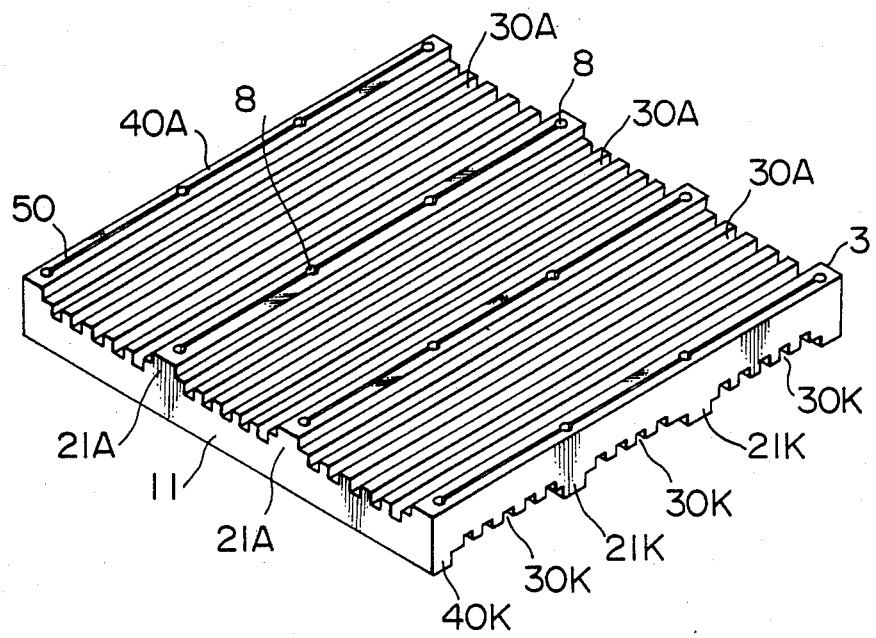
FIG. 4 is a perspective view of the separator of the unit cell of still another embodiment of this invention.

FIG. 4 shows the construction if still another embodiment of the separator. This separator 11 has three electrolytic plate support portions on each surface. Thus, each of the electrode and the electrolytic plate is divided into three parts. In FIG. 4, like elements corresponding to those in FIG. 2 are identified by the same reference numerals. 21A and 21K represent electrolytic plate support portions. When three electrodes and three electrolytic plates are mounted to each surface of the separator 11, to produce one pile, and when two piles are laid on each other, one unit cell can be formed between the upper and lower separators. This unit cell is formed of three sub-unit cells. Thus, according to this embodiment, a large unit cell as compared with that shown in FIG. 3 can be produced without increase of the electrodes and electrolytic plate. If this embodiment is further modified so that the number of the support portions is increased, the unit cell can be further enlarged, enabling the power capacity of the fuel cell to be increased.

Figure 5:
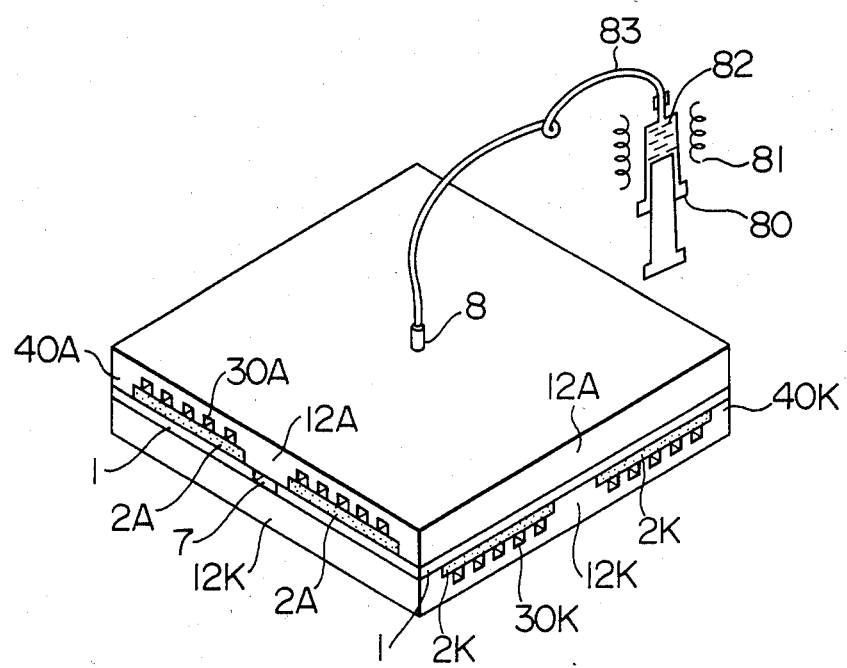
FIG. 5 is a perspective view of the unit cell having the structure shown in FIG. 3, which is provided for the performance test.

The actual performance of the unit cell according to this invention will be described with reference to the experimental results for evaluation. FIG. 5 shows a unit cell formed for evaluation test by laying two piles one of which is shown in FIG. 3, on each other. This unit cell is a cross flow type cell formed of two sub-unit cells. Since we tried to evaluate one unit cell, no electrode was provided on the outsides of the upper and lower separators 12A and 12K. Therefore, only on one side (inner side) of the separator 12A, 12K are provided the gas flow path 30A, 30K support portion 20A, 20K, and the support end portion 40A, 40B shown in FIG. 2. Apertures 8 are provided only at the center of the separators and communicated with the electrolytic dispersion path 7. In FIG. 5, like elements corresponding to those in FIG. 3 are identified by the same reference numerals. 80 represents an electrolyte injector, 81 a heater, and 82 an electrolyte. The electrolyte 82 heated to a certain temperature by the heater 81 was supplied by the injector 80 via a pipe 83 and via the hole 70 and aperture 8 to the electrolyte dispersion path 7.

The separator 12A, 12K of 600 mm square was made of SUS 316. The anode 2A was formed of two nickel electrodes of 220×600 mm and the cathode 2K was formed of two nickel oxide electrodes of 220×600 mm. The electrolytic plate 1 was formed by lithium aluminate base of 280×600 mm, 1 mm thick. The electolyte 82 contained 53 weight % of carbonate (lithium carbonate: potassium carbonate =62 : 38 mol ratio) and was supplied from the central portion of the cell and impregnated into the electrolytic plate 1. An electrically insulating material of lithium aluminate powder was filled into the electrolyte supply hole and the electrolyte distribution path. An anode gas of 80% $H_2$ - 20% $CO_2$ mixture and a cathode gas of 15% $O_2$ - 30% $CO_2$ - 55% $N_2$ mixture were supplied to the gas flow paths 30A and 30K. The operating temperature was 650° C. The experimental results were that the cell voltage was initially 0.73 V at current density of 150 mA/cm², after 100 hours 0.71 V at 150 mA/cm² and after 200 hours 0.63 V at 150 mA/cm², but after supply of electrolyte of 35 ml, increased to 0.72 V at 150 mA/cm².

We claim:

1. A fuel cell including a unit cell that comprises:
a matrix member impregnated with an electrolyte;
a pair of electrodes disposed to oppose through said matrix member;
a pair of separators disposed to oppose through said matrix member and said pair of electrodes; and
a pair of gas paths formed between said separators and said electrodes and supplied with a reaction gas, each of said pair of separators having matrix support portions provided at both ends in a direction perpendicular to said gas paths, said support portions being pressed in contact with said matrix member so as to support said member, thereby sealing said reaction gas, and each of said separators further having at least one additional support portion pressed in contact with said matrix member so as to support said matrix member between said support portions of both said ends, said at least one additional support portion dividing said electrode so that said unit cell is formed by a plurality of sub-unit cells electrically in parallel.

2. A fuel cell according to claim 1, wherein said matrix member is formed by a plurality of matrix member portions, each of which has both ends supported by said support portions of said separators.

3. A fuel cell according to claim 1, wherein said support portions are provided on both surfaces of each of said separators.

4. A fuel cell according to claim 3, wherein said support portions of said separators are provided with flow paths in which said electrolyte is flowed, and said matrix member is supplied with said electrolyte through said flow paths.

5. A fuel cell according to claim 4, wherein said flow paths are provided along a longitudinal direction of said matrix member, and said electrolyte is supplied to said matrix member in a direction perpendicular to said longitudinal direction.

6. A fuel cell according to claim 4, wherein said separator has apertures bored through the support portions on both sides, and said apertures are communicated with the flow paths of the support portions on both said sides.

7. A fuel cell according to claim 1, wherein said pair of gas paths in which said reaction gas is flowed are provided in parallel.

8. A fuel cell according to claim 1, wherein said pair of gas paths in which said reaction gas is flowed are provided perpendicular to each other.

9. A fuel cell including a unit cell that comprises:
a matrix member impregnated with an electrolyte;
a pair of electrodes disposed to oppose through said matrix member;
a pair of separators disposed to oppose through said matrix member and said pair of electrodes; and
a pair of gas paths formed between said separators and said electrodes and supplied with a reaction gas, said matrix member being divided into a plurality of matrix member portions, each of said pair of separators having matrix support portions provided on the side opposite to said matrix member and pressed in contact with both ends of each of said plurality of matrix member portions so as to support said matrix member portions and thereby seal said reaction gas, said electrodes being divided by said support portions.

10. A fuel cell according to claim 9, wherein said support portions are provided on both sides of said separator.

11. A fuel cell according to claim 10, wherein said support portions of said separators are provided with flow paths in which said electrolyte is flowed, and said matrix member is supplied with said electrolyte through said flow paths.

12. A fuel cell according to claim 11, wherein said flow paths are provided along the longitudinal direction of said matrix member and said electrolyte is supplied to said matrix member in the direction perpendicular to said longitudinal direction.

13. A fuel cell according to claim 11, wherein said separator has apertures bored through the support portions of both said sides and said apertures are communicated with the flow paths of the support portions on both said sides.

14. A fuel cell according to claim 9, wherein said pair of gas paths in which said reaction gas is flowed are provided in parallel.

15. A fuel cell according to claim 9, wherein said pair of gas paths in which said reaction gas is flowed are perpendicular to each other.

16. A fuel cell including a unit cell comprising:
a matrix member impregnated with an electrolyte, said matrix member having first and second opposing major surfaces;
a first electrode having at least two portions, said first electrode being in contact with said first major surface of said matrix member;
a second electrode having at least two portions, said second electrode being in contact with said second major surface of said matrix member;
a first separator having a plurality of longitudinally extending, parallel, spaced support portions on a first major surface of said first separator, a first of said plurality of support portions being in contact with and supporting said first major surface of said matrix member at a peripheral portion thereof, a second support portion of said plurality of support portions being in contact with and supporting said first major surface of said matrix member at another peripheral portion thereof, and at least one additional support portion of said plurality of support portions being in contact with and supporting said first major surface of said matrix member at a portion between said peripheral portion and said another peripheral portion, said at least one additional support portion dividing said first electrode into said at least two portions;
a second separator having a plurality of longitudinally extending, parallel, spaced support portions on a first major portion of said second separator, a first portion of said plurality of support portions being in contact with and supporting said second major surface of said matrix member at a peripheral portion thereof, a second support portion of said plurality of support portions being in contact with and supporting said second major surface of said matrix member at another peripheral portion thereof, and at least one additional support portion of said plurality of support portions being in contact with and supporting said second major surface of said matrix member at a portion between said peripheral portion and said another peripheral portion, said at least one additional support portion dividing said second electrode into said at least two portions;

a first set of parallel, spaced, longitudinally extending gas flow paths, said first set of gas flow paths being parallel to said plurality of support portions of said first separator and being defined between said first major surface of said first separator and said first electrode, wherein each of said at least one additional support portions of said first separator is between two of said parallel, spaced gas flow paths of said first set of gas flow paths; and a second set of parallel, spaced, longitudinally extending gas flow paths, said second set of gas flow paths being parallel to said plurality of support portions of said second separator and being defined between said first major surface of said second separator and said second electrode, wherein each of said at least one additional support portions of said second separator is between two of said parallel, spaced gas flow paths of said second set of gas flow paths.

17. A fuel cell according to claim 16, wherein said plurality of support portions of said first separator and said plurality of support portions of said second separator are provided with flow paths in which said electrolyte can be flowed, whereby said matrix member can be supplied with electrolyte through said flow paths.

18. A fuel cell according to claim 16, wherein said first set of parallel, spaced, longitudinally extending gas flow paths extends in a direction parallel to the direction in which said second set of parallel, spaced, longitudinally extending gas flow paths extends.

19. A fuel cell according to claim 16, wherein said first set of parallel, spaced, longitudinally extending gas flow paths extends in a direction perpendicular to the direction in which said second set of parallel, spaced, longitudinally extending gas flow paths extends.

* * * * *